(12) United States Patent
Dorris et al.

(10) Patent No.: US 10,958,147 B2
(45) Date of Patent: Mar. 23, 2021

(54) CONTINUOUS WINDING FOR ELECTRIC MOTORS

(71) Applicant: HYPERLOOP TECHNOLOGIES, INC., Los Angeles, CA (US)

(72) Inventors: James Dorris, Los Angeles, CA (US); Andrew Doyle, Los Angeles, CA (US); Brogan Bambrogan, Los Angeles, CA (US); Joshua Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/007,940

(22) Filed: Jan. 27, 2016

(65) Prior Publication Data

US 2016/0233754 A1 Aug. 11, 2016

Related U.S. Application Data

(60) Provisional application No. 62/235,436, filed on Sep. 30, 2015, provisional application No. 62/113,511, filed on Feb. 8, 2015.

(51) Int. Cl.
| | |
|---|---|
| H02K 41/02 | (2006.01) |
| H02K 15/06 | (2006.01) |
| H02K 15/12 | (2006.01) |
| H02K 3/28 | (2006.01) |
| H02K 3/38 | (2006.01) |
| H02K 3/04 | (2006.01) |

(52) U.S. Cl.
CPC ............... *H02K 41/02* (2013.01); *H02K 3/04* (2013.01); *H02K 15/12* (2013.01)

(58) Field of Classification Search
CPC .. H02K 3/28; H02K 3/38; H02K 3/47; H02K 15/06; H02K 16/12; H02K 41/02
USPC .............................. 310/12.02, 12.21, 45, 208
See application file for complete search history.

(56) References Cited

U.S. PATENT DOCUMENTS

| | | | |
|---|---|---|---|
| 131,322 A | 9/1872 | Anderson | |
| 1,950,627 A * | 3/1934 | Parvin | E05F 15/60 49/280 |
| 2,296,771 A | 9/1942 | Crawford et al. | |
| 2,488,287 A * | 11/1949 | Goddad | B61B 13/122 104/138.1 |
| 2,511,979 A | 6/1950 | Goddard | |

(Continued)

FOREIGN PATENT DOCUMENTS

| | | |
|---|---|---|
| EP | 2371613 | 10/2011 |
| WO | WO2003002370 | 1/2003 |

(Continued)

OTHER PUBLICATIONS

Musk, E., "Hyperloop White Paper," dated Aug. 12, 2013.

(Continued)

*Primary Examiner* — John K Kim
(74) *Attorney, Agent, or Firm* — Greenblum & Bernstein, P.L.C.

(57) ABSTRACT

A magnetically continuous winding includes a first coil and at least one additional coil substantially fixed in place in at least one direction with respect to a position of the first coil. A core formed by a resin is applied to the first coil and the at least one additional coil to substantially bind the first coil and the at least one additional coil.

23 Claims, 13 Drawing Sheets

(56) References Cited

U.S. PATENT DOCUMENTS

| | | | |
|---|---|---|---|
| 2,791,633 A | 9/1956 | Sindzinski | |
| 2,956,823 A | 10/1960 | Benjamin, Jr. et al. | |
| 3,006,288 A | 10/1961 | Brown | |
| 3,083,528 A | 4/1963 | Brown | |
| 3,100,454 A | 8/1963 | Dennis | |
| 3,132,416 A | 5/1964 | Hait | |
| 3,233,559 A | 2/1966 | Smith et al. | |
| 3,605,629 A | 9/1971 | Edwards | |
| 3,610,163 A | 10/1971 | Edwards | |
| 3,738,281 A | 6/1973 | Waidelich | |
| 3,746,899 A * | 7/1973 | Eastham | H02K 41/025 310/12.21 |
| 3,750,803 A | 8/1973 | Paxton | |
| 3,768,417 A | 10/1973 | Thornton et al. | |
| 3,776,141 A | 12/1973 | Gelhard et al. | |
| 3,823,200 A * | 7/1974 | De Pradenne | C08G 59/38 523/427 |
| 3,854,411 A | 12/1974 | Lichtenberg | |
| 3,952,667 A | 4/1976 | Kovanov et al. | |
| 3,954,064 A | 5/1976 | Minovitch | |
| 4,015,540 A | 4/1977 | Roxberry | |
| 4,023,500 A | 5/1977 | Diggs | |
| 4,075,948 A | 2/1978 | Minovitch | |
| 4,108,077 A | 8/1978 | Laing | |
| 4,148,260 A | 4/1979 | Minovitch | |
| 4,175,414 A | 11/1979 | Peytavin | |
| 4,202,272 A | 5/1980 | Teodorescu et al. | |
| 4,400,655 A | 8/1983 | Curtiss et al. | |
| 4,427,740 A | 1/1984 | Stackhouse et al. | |
| 4,603,640 A | 8/1986 | Miller et al. | |
| 4,636,666 A | 1/1987 | Meins | |
| 4,636,667 A | 1/1987 | Holzinger et al. | |
| 4,676,294 A | 6/1987 | Samuelson | |
| 4,718,459 A | 1/1988 | Adorjan | |
| 5,053,654 A | 10/1991 | Augsburger et al. | |
| 5,282,424 A | 2/1994 | O'Neill | |
| 5,388,527 A | 2/1995 | Thornton et al. | |
| 5,619,930 A | 4/1997 | Alimanestiano | |
| 5,656,350 A * | 8/1997 | Koyama | C08G 59/063 428/413 |
| 5,712,514 A | 1/1998 | Fischperer et al. | |
| 5,899,635 A | 5/1999 | Kuja et al. | |
| 5,950,543 A | 9/1999 | Oster | |
| 6,160,327 A * | 12/2000 | Wang | H02K 3/26 310/12.02 |
| 6,167,610 B1 * | 1/2001 | Nakahara | H02K 1/14 29/596 |
| 6,279,485 B1 | 8/2001 | Schlienger | |
| 6,311,476 B1 | 11/2001 | Frye et al. | |
| 6,373,153 B1 | 4/2002 | Hazelton et al. | |
| 6,374,746 B1 | 4/2002 | Fiske | |
| 6,418,857 B1 | 7/2002 | Okano et al. | |
| 6,502,517 B1 | 1/2003 | Groening et al. | |
| 6,510,799 B2 | 1/2003 | Lamb et al. | |
| 6,584,671 B2 | 7/2003 | Miller et al. | |
| 6,684,794 B2 | 2/2004 | Fiske et al. | |
| 6,899,036 B2 | 5/2005 | Lamb et al. | |
| 6,977,451 B2 * | 12/2005 | Onishi | H02K 9/19 310/12.29 |
| 7,005,772 B1 * | 2/2006 | Frederick | H02K 3/28 310/179 |
| 7,096,794 B2 | 8/2006 | Post | |
| 7,204,192 B2 | 4/2007 | Lamb et al. | |
| 7,478,598 B2 | 1/2009 | Post | |
| 7,835,830 B2 | 11/2010 | Ellmann et al. | |
| 7,841,564 B2 | 11/2010 | Ellmann et al. | |
| 7,946,024 B2 * | 5/2011 | Onishi | H02K 41/03 29/596 |
| 8,006,625 B2 | 8/2011 | Yang | |
| 8,118,266 B2 | 2/2012 | Zheng et al. | |
| 8,171,859 B2 | 5/2012 | Loser et al. | |
| 8,214,957 B2 | 7/2012 | Miettinen | |
| 8,250,990 B2 | 8/2012 | Kunz | |
| 8,281,723 B2 | 10/2012 | Loeser et al. | |
| 8,297,195 B2 | 10/2012 | Loser et al. | |
| 8,402,899 B2 | 3/2013 | Loeser et al. | |
| 8,430,037 B2 | 4/2013 | Miller et al. | |
| 8,430,039 B2 | 4/2013 | Zheng et al. | |
| 8,459,188 B2 | 6/2013 | Miller et al. | |
| 8,468,949 B2 | 6/2013 | Kwon et al. | |
| 8,500,373 B1 | 8/2013 | Epps | |
| 8,534,197 B2 | 9/2013 | Miller | |
| 8,578,860 B2 | 11/2013 | Post | |
| 8,734,139 B2 | 5/2014 | Burns et al. | |
| 8,915,192 B2 | 12/2014 | Zhou | |
| 8,917,086 B2 | 12/2014 | Post | |
| 8,985,030 B2 | 3/2015 | Post | |
| 9,085,304 B2 | 7/2015 | Oster | |
| 9,228,298 B2 | 1/2016 | Oster | |
| 9,254,759 B1 | 2/2016 | Henderson et al. | |
| 9,290,187 B2 | 3/2016 | Dalrymple | |
| 9,290,278 B2 | 3/2016 | Dillon | |
| 9,302,577 B2 | 4/2016 | Catalan | |
| 2001/0037747 A1 | 11/2001 | Svensson | |
| 2002/0089237 A1 * | 7/2002 | Hazelton | H02K 41/03 310/12.25 |
| 2002/0197135 A1 | 12/2002 | Arntzen et al. | |
| 2003/0111916 A1 * | 6/2003 | Baccini | H02K 41/031 310/12.33 |
| 2003/0205163 A1 | 11/2003 | Lamb et al. | |
| 2004/0056538 A1 | 3/2004 | Du et al. | |
| 2004/0139723 A1 | 7/2004 | Parkin | |
| 2004/0144086 A1 | 7/2004 | Wollenweber | |
| 2004/0155031 A1 | 8/2004 | Toyooka et al. | |
| 2005/0076802 A1 | 4/2005 | Pullium | |
| 2006/0032063 A1 | 2/2006 | Tomasello et al. | |
| 2006/0235589 A1 | 10/2006 | Deng et al. | |
| 2006/0236890 A1 | 10/2006 | Lamb et al. | |
| 2007/0089636 A1 * | 4/2007 | Guardo, Jr. | B60L 13/10 104/281 |
| 2007/0187556 A1 | 8/2007 | Yoshitake | |
| 2007/0192000 A1 | 8/2007 | Ellmann et al. | |
| 2008/0001481 A1 * | 1/2008 | Miyaji | H02K 41/03 310/12.15 |
| 2008/0236973 A1 | 10/2008 | Hahn et al. | |
| 2008/0275572 A1 | 11/2008 | Tillotson | |
| 2008/0277534 A1 | 11/2008 | Ellmann et al. | |
| 2009/0101040 A1 | 4/2009 | Yang | |
| 2009/0158955 A1 | 6/2009 | Pulliam | |
| 2009/0218893 A1 * | 9/2009 | Kawai | H02K 41/03 310/12.24 |
| 2010/0005997 A1 | 1/2010 | Tozoni | |
| 2010/0031846 A1 | 2/2010 | Loser et al. | |
| 2010/0092243 A1 | 4/2010 | Bauder | |
| 2010/0115947 A1 | 5/2010 | Galbraith | |
| 2010/0143044 A1 | 6/2010 | Kadaster et al. | |
| 2010/0183407 A1 | 7/2010 | Kim | |
| 2010/0192799 A1 | 8/2010 | Miller | |
| 2011/0226764 A1 | 9/2011 | Smith et al. | |
| 2011/0283914 A1 | 11/2011 | Kwon et al. | |
| 2012/0019235 A1 | 1/2012 | Post | |
| 2012/0089525 A1 | 4/2012 | Kley et al. | |
| 2012/0153744 A1 | 6/2012 | Criswell et al. | |
| 2012/0174901 A1 | 7/2012 | Post | |
| 2012/0285575 A1 | 11/2012 | Catha | |
| 2012/0299684 A1 | 11/2012 | Won | |
| 2013/0174757 A1 | 7/2013 | Post | |
| 2013/0276665 A1 | 10/2013 | Dalrymple | |
| 2014/0000473 A1 | 1/2014 | Miller | |
| 2014/0116406 A1 | 5/2014 | Post | |
| 2014/0152124 A1 * | 6/2014 | Hsu | H02K 41/031 310/12.21 |
| 2014/0261055 A1 | 9/2014 | Oster | |
| 2014/0354064 A1 | 12/2014 | Tseliakhovich | |
| 2015/0028704 A1 * | 1/2015 | Ohsawa | H02K 3/12 310/71 |
| 2016/0009196 A1 | 1/2016 | Allard | |
| 2016/0023668 A1 | 1/2016 | Shetty | |
| 2016/0033970 A1 | 2/2016 | Henderson et al. | |

(56) References Cited

U.S. PATENT DOCUMENTS

2016/0059868 A1    3/2016  Allaire
2016/0233754 A1*   8/2016  Dorris .................... H02K 41/02

FOREIGN PATENT DOCUMENTS

| WO | WO2003003389  | 1/2003  |
|----|---------------|---------|
| WO | WO2007087028  | 8/2007  |
| WO | WO2009/135389 | 11/2009 |

OTHER PUBLICATIONS

Wright, I., "Engineering the Hyperloop: Testing 4 Core Elements," dated Feb. 16, 2016.

Protalinski, E., "Hyperloop's intro video claims the future is now," dated Sep. 17, 2015.

GNB Corporation Product Catalog, 20 pages, (Mar. 14, 2013).

Khatait, J., et al., "Design and development of orifice-type aerostatic thrust bearing," SIMTech technical reports, vol. 6, No. 1 (Jan. 2005).

Barsikow, B., et al., "Noise Characteristics of the Transrapid TR08 Maglev System," US Department of Transportation, 338 pages (Jul. 2002).

Brecher, A., et al., "Electromagnetic Field Characteristics of the Transrapid TR08 Maglev System," US Department of Transportation, 224 pages (May 2002).

Chan, L., et al., "Vibration Characteristics of the Transrapid TR08 Maglev System," US Department of Transportation, 143 pages (Mar. 2002).

Todorovich et al., "High-Speed Rail—International Lessons for U.S. Policy Makers," Lincoln Institute of Land Policy, 64 pages (2011).

Peterman, D., et al., "The Development of High Speed Rail in the United States: Issues and Recent Events," Congressional Research Service, 35 pages (Dec. 20, 2013).

International Search Report and Written Opinion of International Searching Authority for related Application No. PCT/US2016/015231, dated Mar. 25, 2016.

International Search Report and Written Opinion of International Searching Authority for related Application No. PCT/US16/15228, dated Apr. 8, 2016.

International Search Report and Written Opinion of International Searching Authority for related Application No. PCT/US16/15215, dated Apr. 8, 2016.

International Search Report and Written Opinion of International Searching Authority for related Application No. PCT/US2016/015234, dated Apr. 4, 2016.

Barboza, D., "A New Port in Shanghai, 20 Miles Out to Sea," The New York Times, Dec. 12, 2005.

International Search Report and Written Opinion of International Searching Authority for related Application No. PCT/US2016/015221, dated Mar. 31, 2016.

International Search Report and Written Opinion of International Searching Authority for related Application No. PCT/US2016/015224, dated Apr. 11, 2016.

International Search Report and Written Opinion of International Searching Authority for related Application No. PCT/US2016/015229, dated Apr. 4, 2016.

Thornton. R., "The Future of Maglev," Magnemotion, Nov. 5, 2007.

International Search Report and Written Opinion of International Searching Authority for related Application No. PCT/US2016/015206, dated Apr. 1, 2016.

International Search Report and Written Opinion of International Searching Authority for related Application No. PCT/US2016/015236, dated Mar. 29, 2016.

International Search Report and Written Opinion of International Searching Authority for related Application No. PCT/US2016/015238, dated Apr. 1, 2016.

International Search Report and Written Opinion of International Searching Authority for related Application No. PCT/US2016/015239, dated Mar. 30, 2016.

* cited by examiner

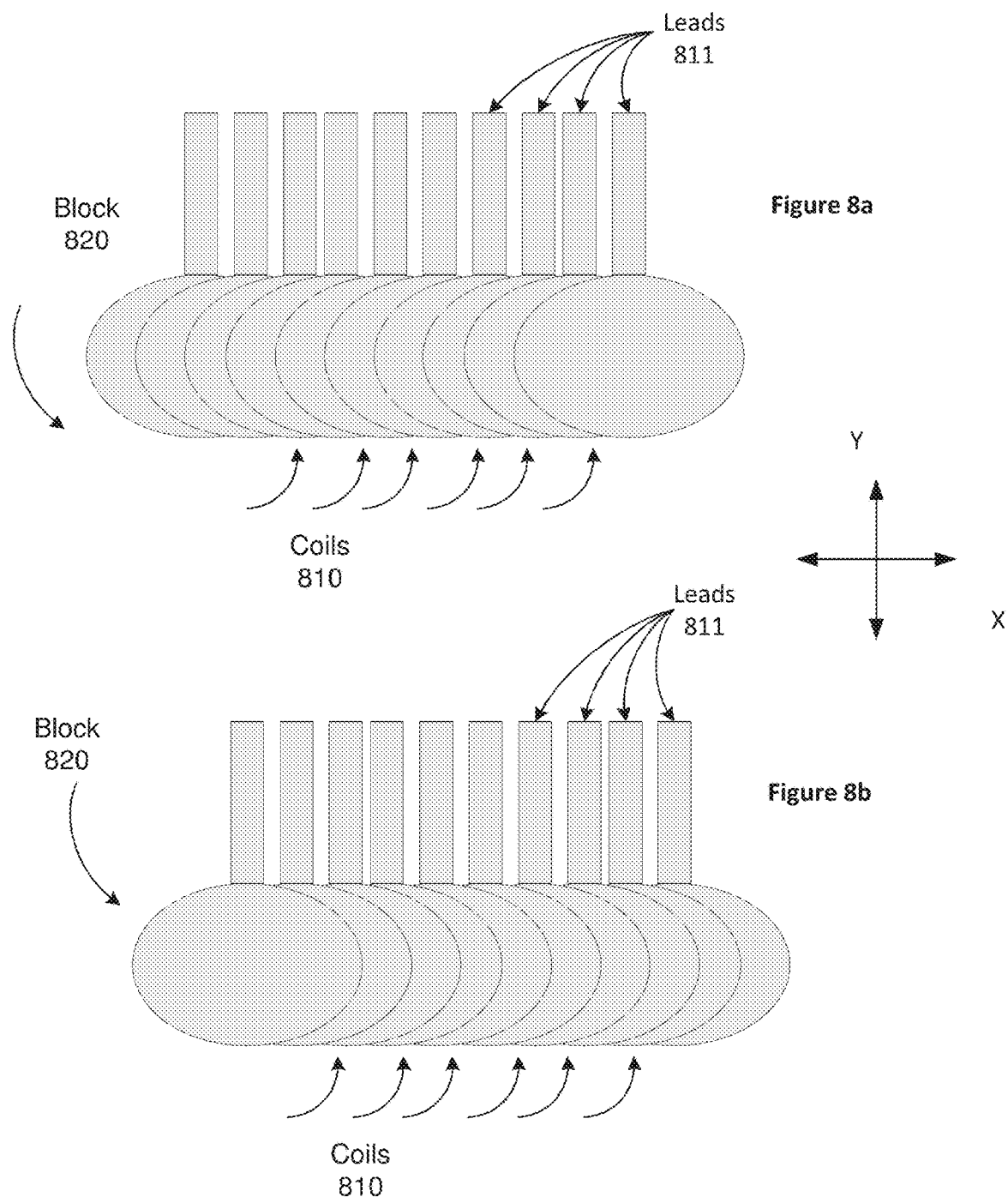

Front View

Coil 910

Top View

Coil 910

CONTINUOUS WINDING FOR ELECTRIC MOTORS

CROSS REFERENCE TO RELATED APPLICATION

The present application claims the benefit of U.S. Provisional Application No. 62/235,436, filed on Sep. 30, 2015, and of U.S. Provisional Application No. 62/113,511, filed on Feb. 8, 2015, the disclosures of which are expressly incorporated by reference herein in their entireties.

BACKGROUND

1. Field of the Disclosure

The present disclosure relates to the field of electric motors. More particularly, the present disclosure relates to a continuous winding for a linear electric motor.

2. Background Information

A linear motor is an electric motor that has had its stator and rotor "unrolled" so that instead of producing torque, it produces a linear force along its length. This can be useful for a variety of purposes including high speed transportation systems. Generally, the core of the motor is pre-manufactured from laminated steel. Coils are then wound around the core during manufacturing, either in a concentrated winding configuration or a distributed winding configuration. In a distributed winding pattern, adjacent coils can overlap such as when 3 sinusoidal distributed windings with axes displaced by 120° are used as a stator for a 3-phase AC machine with 2 poles.

Medium Voltage (MV) is defined by the Institution of Electrical and Electronic Engineers (IEEE) as 1 kV to 100 kV. For motors such as those operating at medium voltage, air is sometimes removed from between the coils and core. Air can be removed by several different processes including vacuum pressure impregnation and varnish dipping. The assembled coils and core are then shipped from the manufacturer to the field.

A distributed winding configuration produces a Motor Magnetic Field (MMF) profile that is more sinusoidal than the profile created by a concentrated winding configuration. This can be desirable insofar as a sinusoidal motor magnetic field profile reduces space harmonics. For an induction motor, space harmonics can introduce a great quantity of loss and force ripple into the system. Insofar as such losses and ripple can renders a system impractical or unscalable, a distributed winding configuration for an induction motor needs to be as efficient as possible.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein:

FIG. 8a is a block for a continuous winding for electric motors, according to an aspect of the present disclosure;

FIG. 8b is a block for a continuous winding for electric motors, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

As described herein, a series of coils are arranged together for form a winding. Resin is applied to the coils to form a block. A series of blocks are interconnected to form a continuous winding. The continuous winding forms a stator that can be used in a linear motor.

Figure 1:
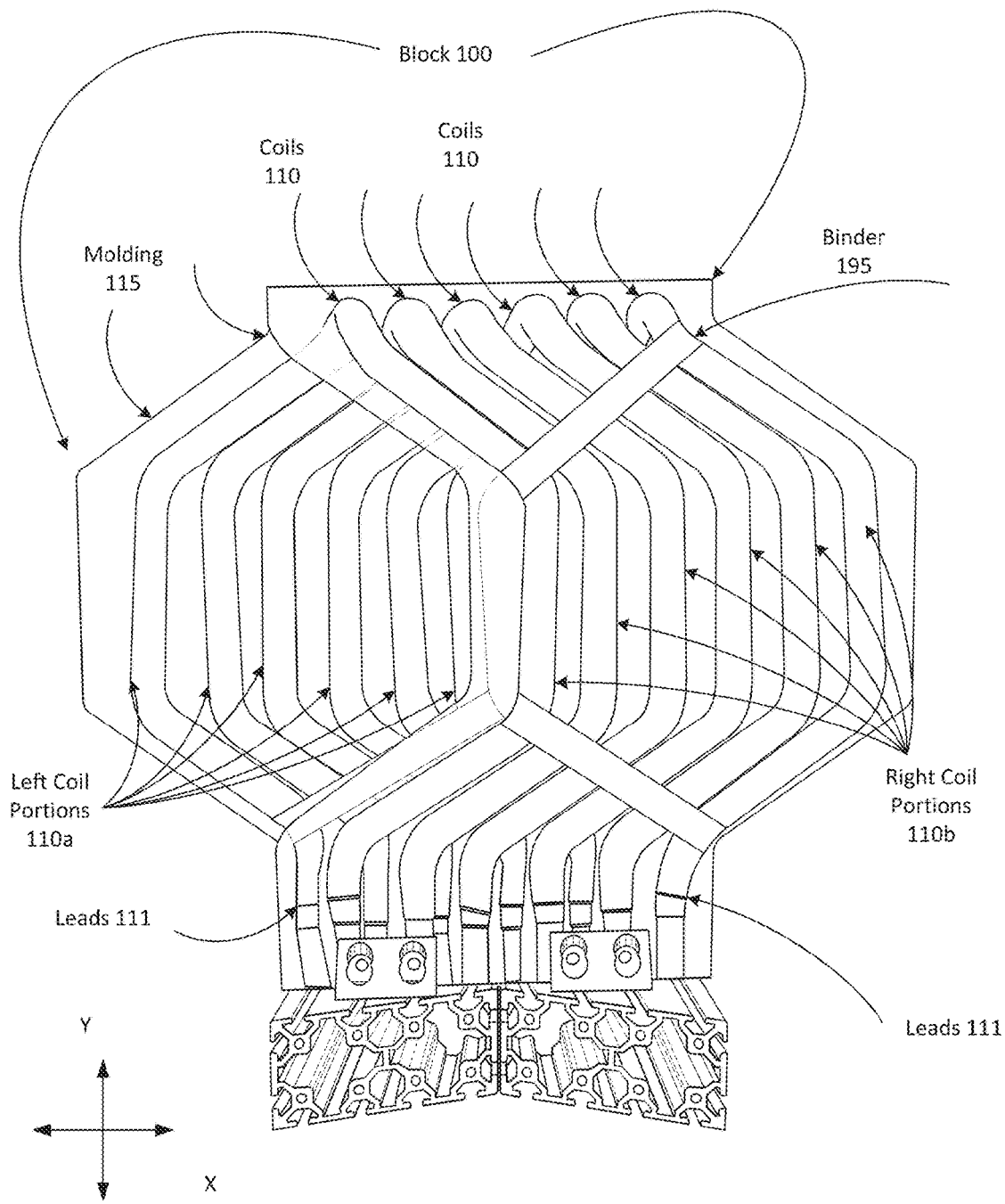
FIG. 1 is a side view of an embodiment showing coils in a block for a continuous winding for electric motors, according to an aspect of the present disclosure.

FIG. 1 is a side view of an embodiment showing coils 110 in a block 100 for a continuous winding for electric motors, according to an aspect of the present disclosure. As is known, the open area in the central portion of a winding is known as a core or magnetic core. In FIG. 1, six coils 110 are shown aligned together to form a winding, and are molded into a block. Coils 110 may be made, for example, of copper.

The arrows designating each coil 110 point to a top of each coil 110 in FIG. 1. The coils 110 include two portions, a left coil portion 110a and a right coil portion 110b. The left coil portion 110a and right coil portion 110b are offset from one another. The left coil portion 110a of each coil 110 is to the left of the top of each coil 110 shown in FIG. 1. The right coil portion 110b of each coil 110 is to the right of the top of each coil 110 shown in FIG. 1.

The offsetting of the left coil portions 110a and right coil portions 11b leaves the two portions substantially disposed on or along two different offset but parallel planes. The right portion 110b of each of the five left-most coils 110 is seated in the similar offset right portion 110b of the coil 110 immediately to the right. The left portion 110a of each of the five right-most coils 110 is seated in the similar offset left portion 110a of the coil 110 immediately to the left. As shown, the support provided by a portion of one coil 110 to an adjacent coil 110 is in multiple directions, including a lateral component and a vertical component. The support is therefore in orthogonal directions designated in FIG. 1 as X and Y.

As described herein, the relationship of one coil to an adjacent coil can be described by a variety of terms, including interlocked, nested and/or interweaved.

FIG. 1 also shows that the coils 110 are physically bound in several places by binders 195. The binders 195 may be used to bind the coils 110 together prior to resin being applied in a molding process. The molding itself is designated 115 in FIG. 1, and is applied so as to encase the coils 110 together, forming the block 100.

In FIG. 1, block 100 is shown to include six (6) coils. However, a block 100 can be formed of more or less than six (6) coils, and a series of blocks may each have the same number of coils or a different number of coils. If each block has the same number of coils, the manufacturing process may be more efficient, whereas if some blocks do not have the same number of coils, an additional amount of versatility is provided to the process of actually manufacturing a long linear motor for a transportation system.

Blocks for a continuous winding of a linear machine as described herein also harness benefits of a magnetically continuous winding. Benefits include
 reduced space harmonics
 lowered core loss
 reduced eddy currents on induction secondary windings
 absence of non-uniform MMF distribution that occurs due to segmentation.

A block 100 as shown in FIG. 1 may be formed approximately three feet tall from top to bottom, on the order of five feet wide from left to right, and may weigh on the order of several hundred pounds. Blocks 100 may be aligned and connected in series by the dozens, hundreds or even thousands in order to build a transportation system as described herein.

Figure 2:
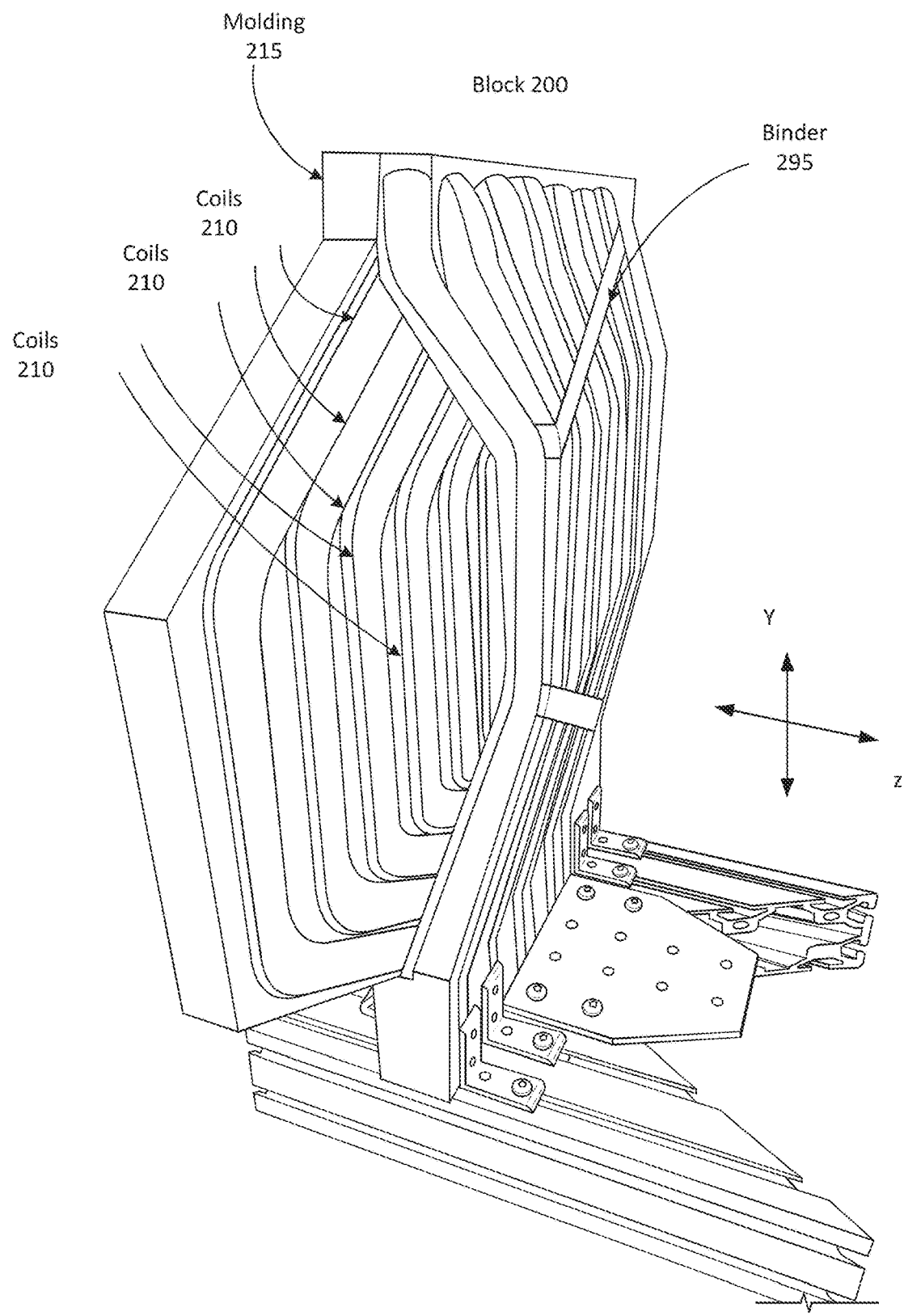
FIG. 2 is another perspective of an embodiment showing coils in a block for a continuous winding for electric motors, according to an aspect of the present disclosure.

One embodiment of the continuous winding for electric motors described herein includes joints to connect different blocks and segments with multiple blocks together. Joints that can be used to interconnect blocks include groove joints and splice joints. Any joint system can be used that allows the winding configuration to
 create a magnetic force that is continuous or substantially continuous
 minimize or eliminate magnetic gaps between discrete blocks of coils and/or discrete segments of multiple blocks of coils FIG. 2 is another perspective that shows coils 210 in a block 200 for a continuous winding for electric motors, according to an aspect of the present disclosure. In FIG. 2, the block 200 may be the same block as block 100 in FIG. 1, shown from a different angle. From the angle shown in FIG. 2, it can be seen that the block 200 can be aligned with an adjacent block (not shown). The portions of coils 210 indented to the right are offset from the portions of coils 210 indented to the left. Similarly, the molding 215 is applied to the coils 210 so that the resultant blocks 200 include two portions offset from one another. The offsetting allows the right portion of the left-most coil 210 of block 200 to be seated in a similar offset right portion of a coil 210 in another block 200 immediately to the left on the page (not shown), and a left portion of the right-most coil 210 of block 200 to be seated in the similar offset left portion of a coil 210 in another block 200 immediately to the right on the page (not shown).

Accordingly, the coils 110 in FIG. 1 and coils 210 in FIG. 2 are nested so as to be supported in multiple dimensions and directions by adjacent coils. The blocks 100 and 200, each of which includes multiple coils 110 and 210 respectively, can also be nested with other blocks so as to be supported in multiple dimensions and directions by adjacent blocks.

Figure 3:
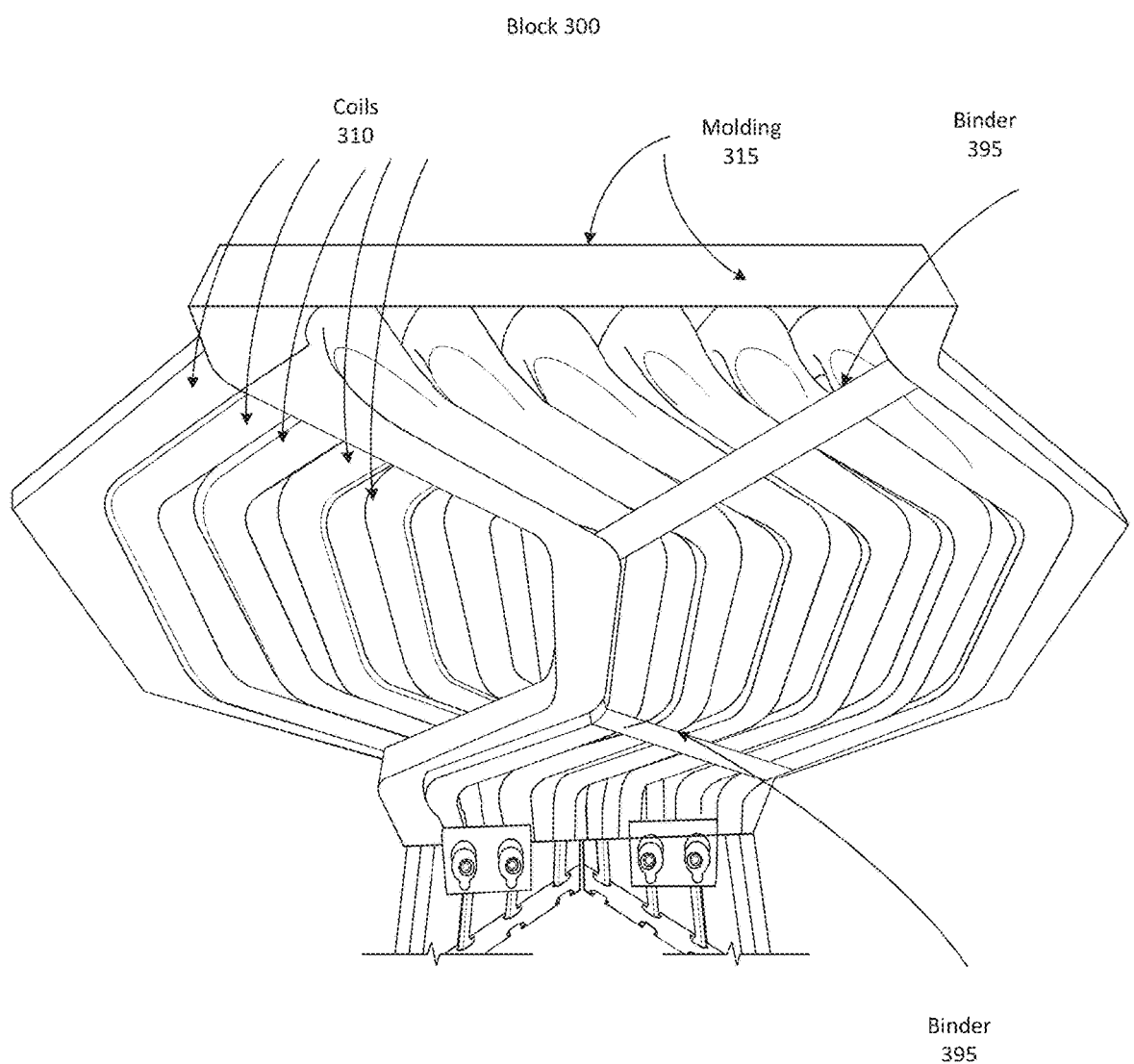
FIG. 3 is a top view of an embodiment showing coils in a block for a continuous winding for electric motors, according to an aspect of the present disclosure.

FIG. 3 is a top view of an embodiment showing coils in a block for a continuous winding for electric motors, according to an aspect of the present disclosure. In FIG. 3, the molding 315 is applied to coils 310 only at upper portions of the block 300. The coils 310 are bound by binders 395 and the molding 315 is applied on top of the upper binder 395 shown in FIG. 3. The binding by binders 395 may be performed automatically by a system that also places the coils 310 in place prior to molding. As should be clear from FIG. 3, a variety of molding configurations can be used to form a block 300 with multiple coils 310. By selectively applying molding to only a portion of the coils 300, the costs and complexity of the molding process can be reduced. The molding 315 in FIG. 3 results in blocks 300 being formed that can be aligned adjacent to one another and connected.

In the embodiment of FIG. 3, the offsetting of the coils 310 allows the right portion of the left-most coil 310 of block 300 to be seated in a similar offset right portion of a coil 310 in another block 300 immediately to the left on the page (not shown), and a left portion of the right-most coil 310 of block 300 to be seated in the similar offset left portion of a coil 310 in another block 300 immediately to the right on the page (not shown). Therefore, the coils 310 and blocks 300 are all nested so as to be supported in multiple dimensions and directions by adjacent blocks.

Terms such as "nested", "supported", and "interlocked" herein generally require at least that an individual coil or block is restricted from movement in two orthogonal directions. The restriction from movement may be relative or absolute, and generally means that any attempt to move in either of the two orthogonal directions results in a counterforce being applied by an adjacent coil and/or block. The counterforce may result at least from inertia of the adjacent coil or block, but may also result from coils or blocks being anchored in place by bonding agents or any type of fixed connection with a transportation tube. Of course, as described herein, coils can be bound together with binders 195, 295, 395, and can also be molded together by molding 115, 215, and 315. Therefore, it should be understood that the nesting described herein is in place before any such binding and molding is applied to the coils.

Figure 4:
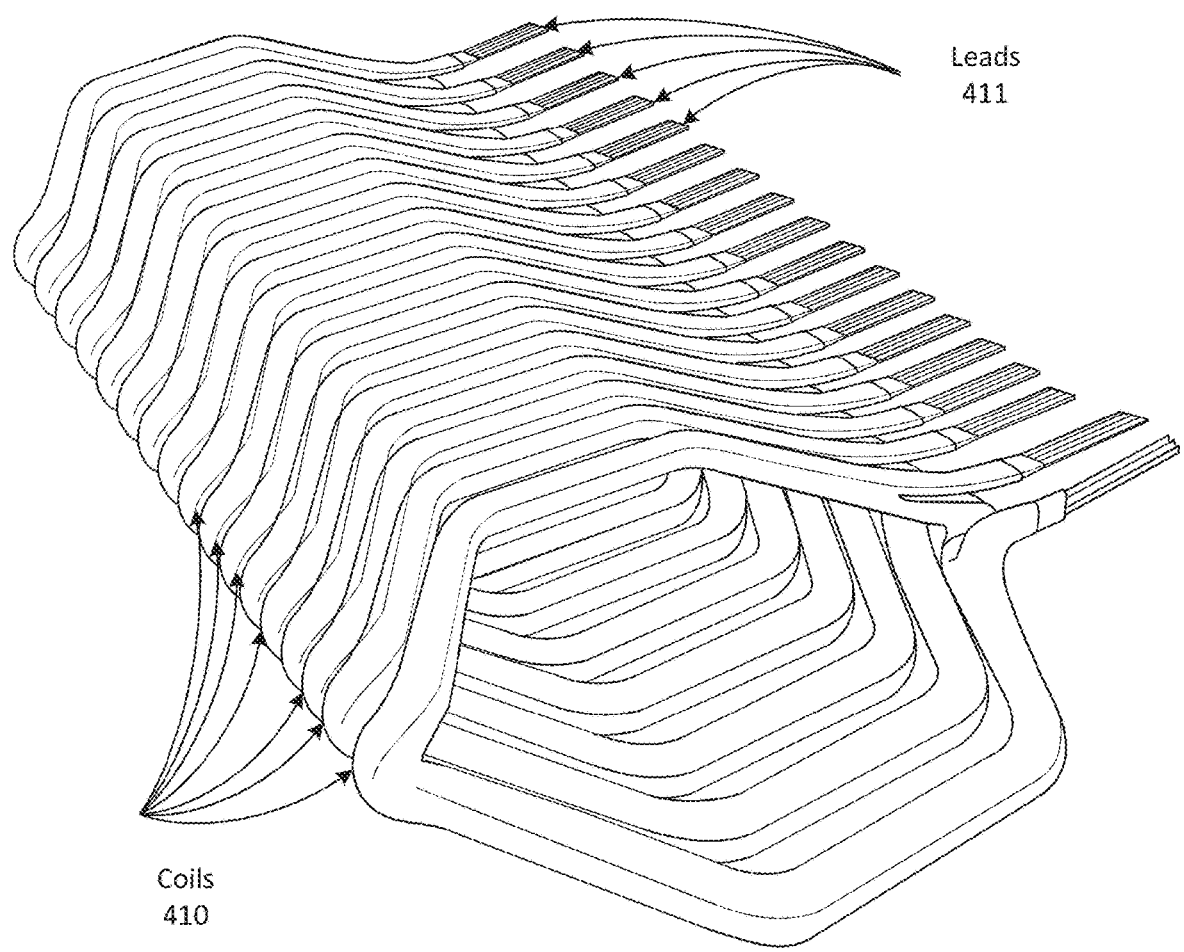
FIG. 4 is a top view of a continuous winding configuration showing coils for a continuous winding for electric motors, according to an aspect of the present disclosure.

FIG. 4 is a top view of a continuous winding configuration showing coils in blocks for a continuous winding for electric motors, according to an aspect of the present disclosure. In FIG. 4, a series of coils 410 are aligned without binding or molding. Leads 411 for several coils 410 are also noted in FIG. 4. In FIG. 4, the coils 410 are nested before binding or molding is applied. Coils 410 may be aligned at fixed spacing from one another before binding and molding is systematically applied to create a block.

Figure 5:
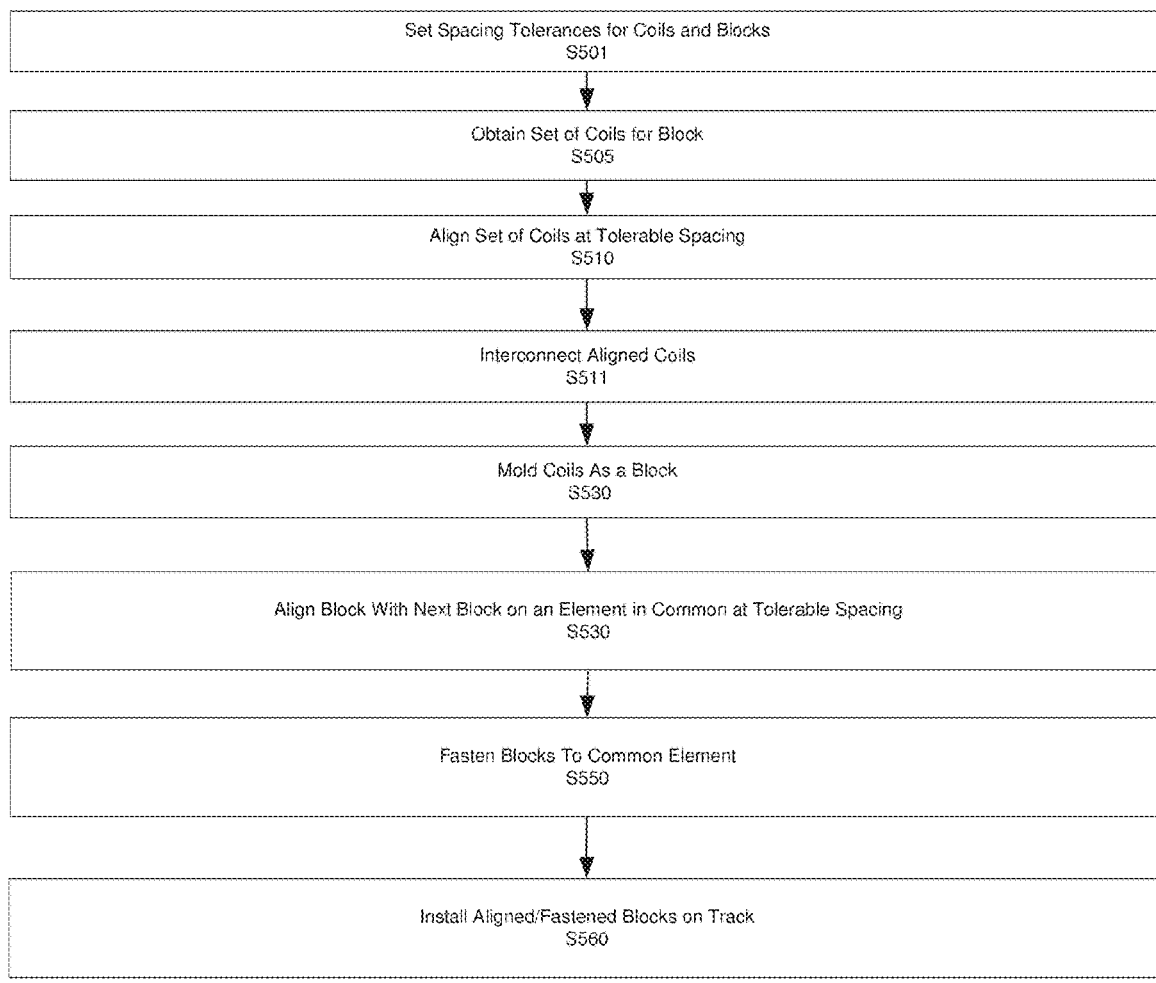
FIG. 5 is a method for producing a continuous winding for electric motors, according to an aspect of the present disclosure.

FIG. 5 is a method for producing a continuous winding for electric motors, according to an aspect of the present disclosure. In FIG. 5, the process begins by setting spacing tolerances for coils and blocks at S501. As one (non-limiting) example, substantially-identical adjacent coils may be expected to touch at two extremities such as near tops and bottoms, and may be expected to maintain spacing of three (3) inches at the center. The "top" and "bottom of a coil may be considered an arbitrary designation satisfied by any points at opposing extremities on the periphery of any coil. Alternatively, a "top" or "bottom" may include an extremity at a point on a side which includes leads, and a point on an opposing extremity. Spacing may be set at two (2) or more points on adjacent coils so as to ensure that coils are aligned consistently in a resultant block.

At S505, a set of coils for a block are obtained. The coils may be manufactured by the same entity that manufactures the blocks described herein. Alternatively, coils may be procured from an external supplier and placed in a supply area from which the coils can be retrieved by a manufacturing system. At S510 the coils are aligned at the tolerable spacing set in S501. The coils may be placed on, at or in preset holders that are preset at fixed distances from one another. Alternatively, the coils may be placed on, at or in a fixed surface or structure, and then individually aligned at fixed distances from one another. The spacing may be set or checked for particular points on each coil, such as at an extremity or a set distance from the extremity in a particular direction.

The actions at S510 include aligning coils in any nested arrangement relative to one-another, such as a distributed winding. For example, a first coil may be placed on a surface, and then a second coil may be negotiated into a nested position supported in multiple orthogonal directions by surfaces of the first coil. A third coil may then be negotiated into a nested position supported in multiple orthogonal directions by surfaces of the second coil, and so on until a complete winding for a block is completed.

At S511, the aligned coils are interconnected. The coils may be interconnected by binding as described above, by nesting as described above, or by any other actions to ensure that at least two like portions of adjacent coils physically contact one another. S511 may include additional connections beyond interconnections already made at previous steps in FIG. 5. Alternatively, a process may not include a separate S511 when interconnections between coils are already in place.

At S530, a winding formed by multiple coils is molded to form a block. The coils of the winding are aligned and interconnected prior to the molding. The molding may be applied systematically, such as when the coils are arranged in a preset vessel that can be filled with a molding material. Such a preset vessel is useful when blocks with substantially identical physical and electromagnetic characteristics are desired.

Of course, the molding may also be applied at S530 selectively in a controlled process rather than in a preset process. That is, molding may be applied in an iterative process using feedback from visual and sensory monitors, rather than simply filling a container with coils with the same amount of mold each time.

The molding process at S530 includes applying resin. For air-gap windings, the molding process at S530 can be performed with a compression or injection molded polymer. For steel cores, the molding process at S530 can be used to fabricate blocks using a variety of moldable soft magnetic materials generally formed by a magnetic powder in a polymer binder. Using soft magnetic materials, the molding process provides a high permeability that improves the flux density in electric machines. The high permeability helps avoid interference with the electromagnetic function of the linear motor, and can enhance structural integrity.

At S550, aligned blocks formed by the molding are fastened to a common element. Two adjacent blocks may be fastened together indirectly by fastening each block to the same element. For example, two molded blocks may each be attached to the same plate using adhesive, screws, nails or any other element that can be used to fasten a block to a plate. In this way, each set of adjacent blocks can be fastened to a common element such that most or all blocks are fastened to two common elements: one shared with the previous block (if any) and one shared with the next block (if any). Alternatively, all blocks for a segment or the entirety of a transportation system may be fastened to the same common element, such as a continuous rail or tube.

At S560, aligned and fastened blocks are installed on, along or otherwise to a track or other component of a transportation system. The blocks may be installed in series along a tube as described herein, and may be connected individually or in groups to a power source. The power source(s) can then be used to power vehicles moving along the transportation system, including pods moving within a tube of a transportation system. Examples of transportation systems are disclosed in commonly assigned U.S. patent application Ser. No. 15/007,783, filed on even date herewith and entitled "Transportation System", the entire contents of which are expressly incorporated by reference herein in their entirety.

Figure 6A:
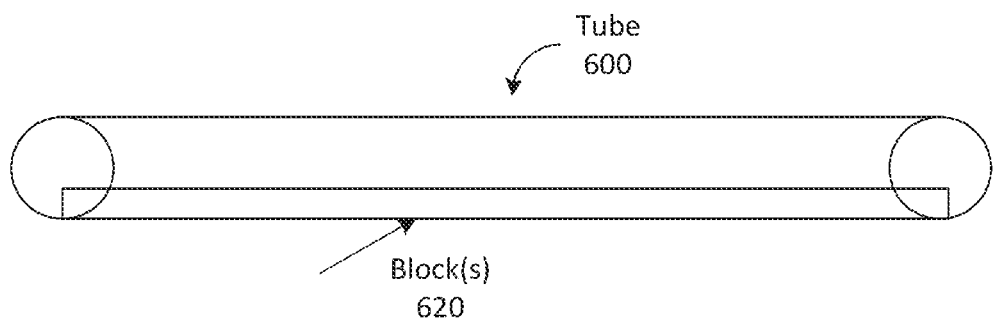
FIG. 6a is a cutout side view of a transportation system that includes blocks for a continuous winding for electric motors, according to an aspect of the present disclosure.

FIG. 6*a* is a cutout side view of a transportation system that includes blocks for a continuous winding for electric motors, according to an aspect of the present disclosure. In FIG. 6*a*, tube 600 is analogous to a subway tunnel, or a tube within which transportation pods can travel. An electromagnetic system powers pods 698 that move through the tube 600. The electromagnetic system may include magnets provided on each pod 698 and the system of aligned and interlocked blocks 620 that include coils that form a continuous winding as described herein.

The tube 600 may be depressurized (vacuumed) in a way that reduces resistance encountered by the pods 698 as they move through the tube 600. In this way, pods 698 may achieve faster speeds using the electromagnetic system that includes the aligned and interlocked blocks 620.

Figure 6B:
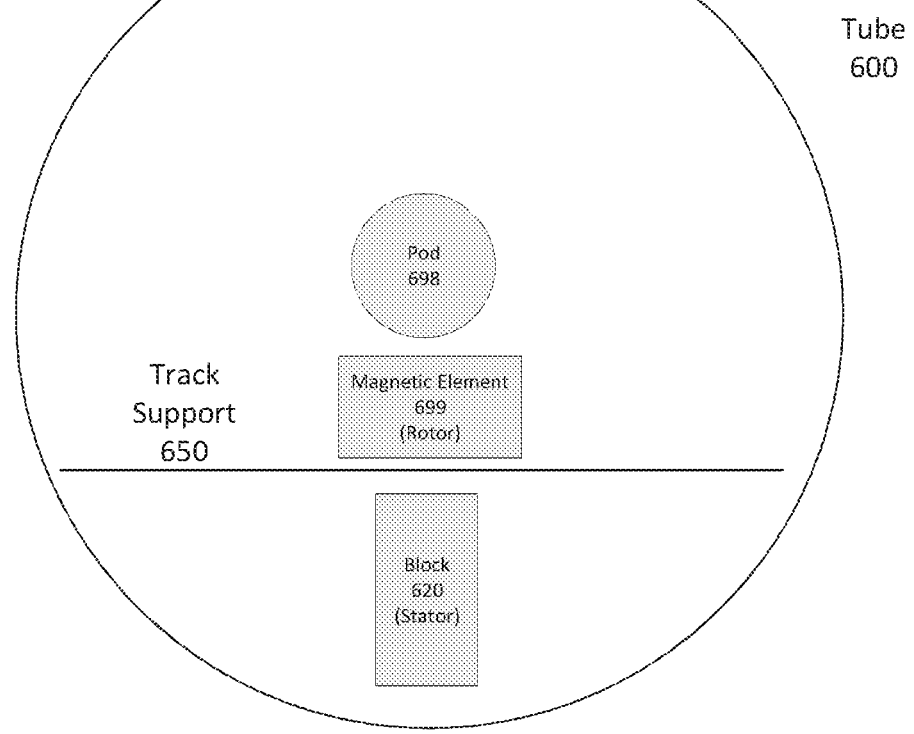
FIG. 6b is a frontal view of a transportation system that includes blocks for a continuous winding for electric motors, according to an aspect of the present disclosure.

FIG. 6*b* is a frontal view of a transportation system that includes blocks for a continuous winding for electric motors, according to an aspect of the present disclosure. In FIG. 6*b*, the tube 600 includes a track support 650 and blocks 620. The blocks 620 are the interconnected molded blocks of nested coils described herein.

In FIG. 6b, the pod 698 is shown separate from the magnetic element 699 (rotor). However, the magnetic element 699 may be a component of the pod 698. In this way, electromagnetic force can be dynamically generated as the pod 698 moves through the tube 600.

The track support 650 is shown as a horizontal line in FIG. 6b, but may have a variety of configurations relative to the blocks 620 described herein (see commonly assigned U.S. patent application Ser. No. 15/007,783, incorporated by reference above). For example, the blocks 620 can be installed under a track support 650, on top of a track support 650, between two components of a track support 650, or next to one component of a track support 650. In one embodiment, the track support 650 may include a single vertical guiding track installed at, for example, the center of the bottom of the tube 600, and the blocks 620 may be aligned parallel to the guiding track as a series of blocks 620 aligned in series to form a continuous winding. Power is supplied to the blocks 620 in order to generate voltage that works together with the magnetic element 699 to produce an electromagnetic force that propels the pods 698 through the tube 600. In this way, the magnetic elements 699 and powered blocks 620 form a linear motor.

Figure 7:
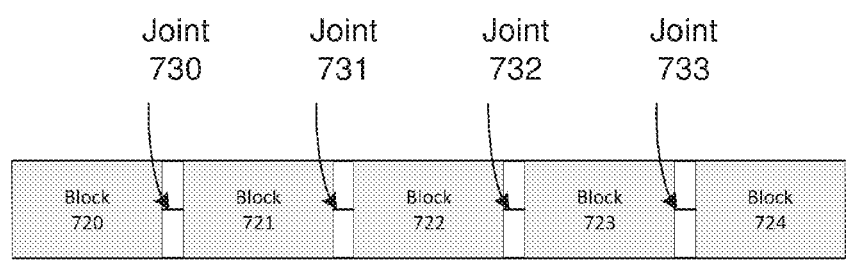
FIG. 7 is a set of interconnected blocks for a continuous winding for electric motors, according to an aspect of the present disclosure.

FIG. 7 is a set of interconnected blocks for a continuous winding for electric motors, according to an aspect of the present disclosure. In FIG. 7, block 720 is connected to block 721 by joint 730. Block 721 is connected to block 722 by joint 731. Block 722 is connected to block 723 by joint 732. Block 723 is connected to block 724 by joint 733.

The joints 730, 731, 732 and 733 may be installed in the blocks 720-723 at the time molding is applied to coils in order to form the blocks 730-733. Alternatively, a joint or joints may be installed on each block after the molding dries and the block is formed. In any event, the joint or joints 730-733 can be substantially identical as a result, for example, of a systematic production process for building the blocks 720-724. As explained above, in a linear motor that includes the blocks 720-724, the blocks 720-724 work together with magnetic elements on the pods. The blocks 720-724 serve as stators, and the magnetic elements as rotors, in the linear motor. The blocks 720-724 can be aligned and interlocked using substantially identical joints 730-733 to form a magnetically continuous winding.

FIG. 8a is another example of a block for a continuous winding for electric motors, according to another aspect of the present disclosure. In FIG. 8a, block 820 includes coils 810. Coils 810 each include a lead 811. FIG. 8b is a block for a continuous winding for electric motors, according to an aspect of the present disclosure. In FIG. 8b, block 820 includes coils 810, each of which include a lead 811.

In FIG. 8a, the coils 810 are shown nested within one another from left to right, as if a planar left-most coil 810 was laid down and then each additional planar coil 810 is laid down consecutively from left to right, one on top of the next. In FIG. 8b, the coils 810 are shown nested within one another from right to left, as if a planar right-most coil 810 was laid down and then each additional planar winding 810 is laid down consecutively from right to left, one on top of the next. However, the coils 810 in FIGS. 8a and 8b will be multi-planar, when the nesting as described herein provides support in orthogonal directions (see, e.g., the coils 210 of FIG. 2). For example, FIG. 8a may be a cutout view showing the rear halves only of coils 810, where each coil 810 is formed in the shape of a "V" when viewed from above. In this way, after the left-most coil 810 is set initially, each coil 810 is inserted from the right into the next winding 810 to the left. Similarly, FIG. 8b may be a cutout view showing the rear halves only of coils 810, where each coil 810 is formed in the shape of a "V" when viewed from above. In this way, after the right-most coil 810 is set initially, each winding 810 is inserted from the left into the next coil 810 to the right. The resultant configuration of coils 810 results in nested coils that are restricted from moving laterally in the x direction or forward/rearward in the z direction.

Figure 9A:
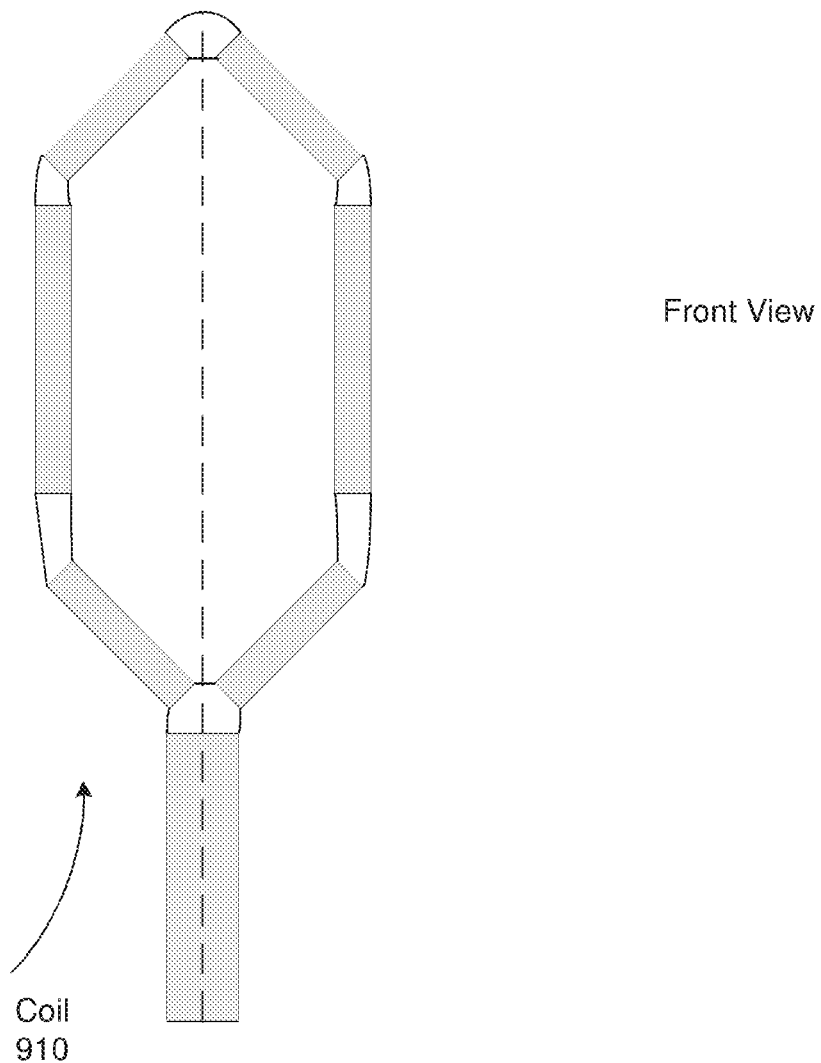
FIG. 9a is a front view of a coil for a continuous winding for electric motors, according to an aspect of the present disclosure.

FIG. 9a is a front view of a coil 910 for a continuous winding for electric motors, according to an aspect of the present disclosure. In the view of FIG. 9a, a dashed vertical line is shown at the center of the coil 910. The dashed vertical line is shown to denote that one side of the coil 910 is offset substantially from the other side of the coil 910 (see, e.g., FIG. 1). Either the left side of the coil 910 is offset to the rear of the right side, or the right side of the coil is offset to the rear of the left side. In this way, the left side of the coil 910 can be nested into the left side of another coil 910 to the left of the coil shown, and the right side of the coil 910 can be nested into the right side of another coil 910 to the right of the coil shown.

Although only a single coil 910 is shown in FIG. 9a, a set of nested coils 910 can be used to construct a block as described herein, and a set of blocks can be used to construct a continuous winding for an electric motor. Using arbitrary numbers in the context of a large transportation system, thousands of blocks with tens of thousands of such coils 910 can be aligned for kilometers (or longer) in order to construct a large continuous winding for a linear electric motor for pods in a transportation tube as described herein. For example, magnetically continuous blocks forming a winding can be distributed over several dozen kilometers in or around a long transportation tube.

Figure 9B:
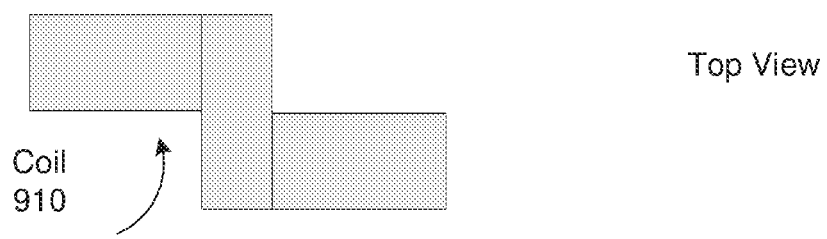
FIG. 9b is a top view of a coil for a continuous winding for electric motors, according to an aspect of the present disclosure.

FIG. 9b is a top view of a coil 910 for a continuous winding for electric motors, according to an aspect of the present disclosure. In FIG. 9b, the left side of the coil 910 is shown offset from the right side of the coil 910. The context for the top view in FIG. 9b is the same context as for the front view in FIG. 9a, insofar as the left side of the coil 910 is nested into another coil 910 to the left, and in turn a coil 910 to the right is nested into the left side of the coil 910 shown in FIG. 9b. Similarly, the right side of the coil 910 is nested into another coil 910 to the right, and in turn a coil 910 to the left is nested into the right side of the coil 910 shown in FIG. 9b. Thus, the coils can be aligned and nested by dozens, hundreds, thousands or tens of thousands so as to construct a continuous winding for an electric motor for a transportation system.

Figure 10:
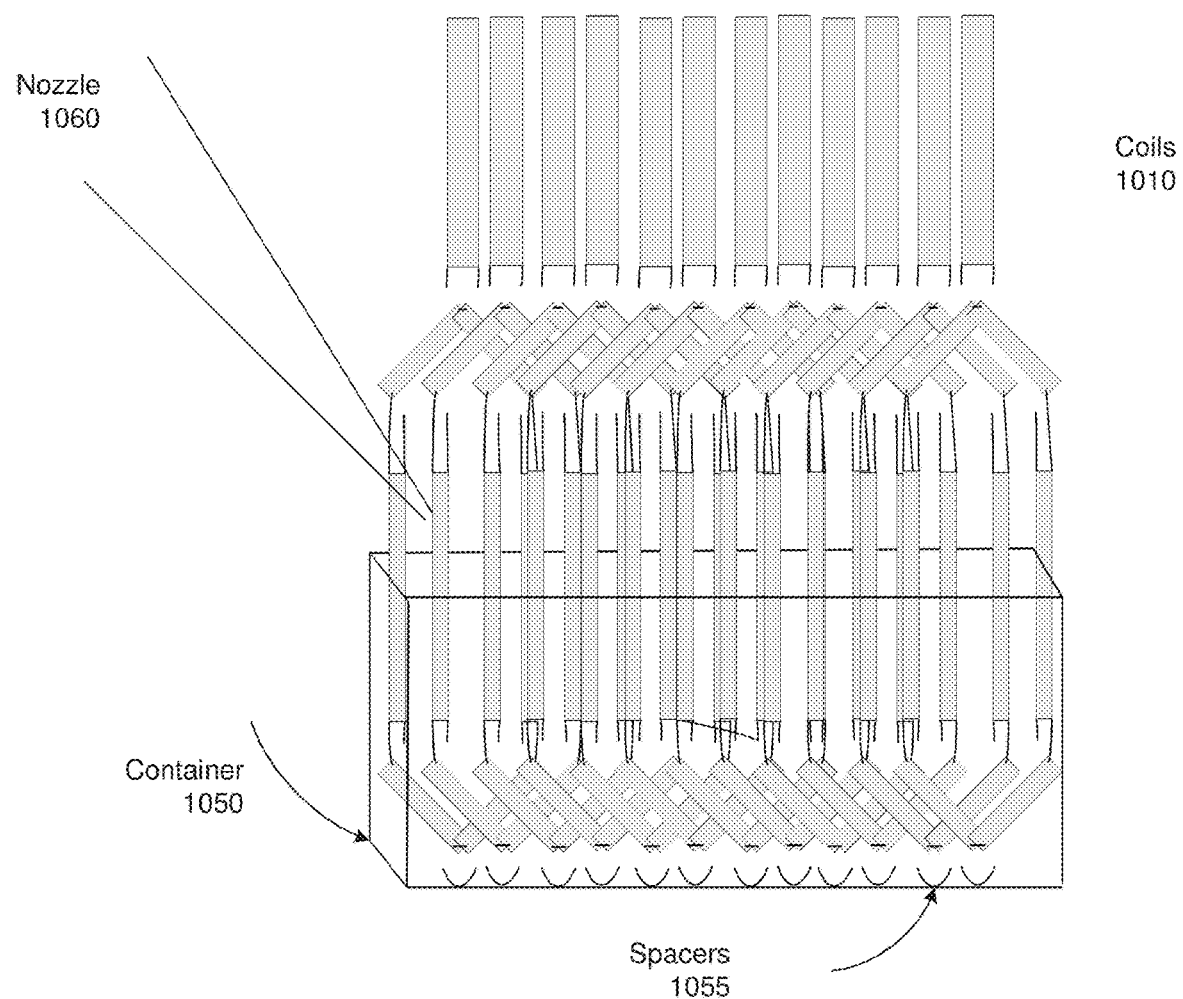
FIG. 10 shows a system for building a block for a continuous winding for electric motors, according to an aspect of the present disclosure.

FIG. 10 shows a system for building a block for a continuous winding for electric motors, according to an aspect of the present disclosure. In FIG. 10, a container 1050 includes walls and a bottom to form a box-like structure with an open top. Spacers 1055 are disposed within the container 1050, either as fixed components of the container 1050 or fixed accessories installed in the container 1050. Alternatively, a mold may have location identifiers similar to a ruler to provide correct coil placements relative to one another. As yet another alternative, spacers can be fixed between coils 1010 and co-molded along with the coils.

The spacers 1055 are set so as to position coils 1010 at fixed distances from one another at substantially-identical locations. In FIG. 10 the coils 1010 are fixed to the spacers 1055 at extreme bottoms of the coils 1010. However, the coils 1010 may be fixed to spacers at higher positions of the coils 1010, such as when the spacers 1055 are components of a structure elevated above the bottom of the container 1050. The spacers may be made, for example, of steel.

In FIG. 10, once coils 1010 are aligned in container 1050 on spacers 1055, molding can be applied via the nozzle 1060. For example, the container 1050 may be filled with molding until the molding reaches the top of the container 1055 or another point monitored by a sensor system.

A container 1050 may be structured in a more complex manner than the box-like structure shown in FIG. 10, so as to reduce the amount of mold which needs to be applied to the spaced and nested coils 1010. For example, the container 1050 may include multiple additional spacers (not shown) at a middle or upper elevation to additionally ensure consistent spacing between coils 1010 at multiple points. These additional spacers may also result in a reduction in the amount of mold applied via the nozzle 1060 to form a block. As another alternative, the volume of molding required may be reduced by reducing the portions of the coils 1010 that are encased in the molding.

In any event, once the molding material is applied via the nozzle 1060, the blocks described herein are lifted or otherwise removed from the container 1050 and spacers 1055. Using one or more identical or substantially-identical container(s) 1050 results in uniform or substantially-uniform blocks being produced with uniform spacing between coils 1010. The uniform blocks can then be aligned in a process so as to result in the continuous winding for an electric motor as described herein.

Figure 11:
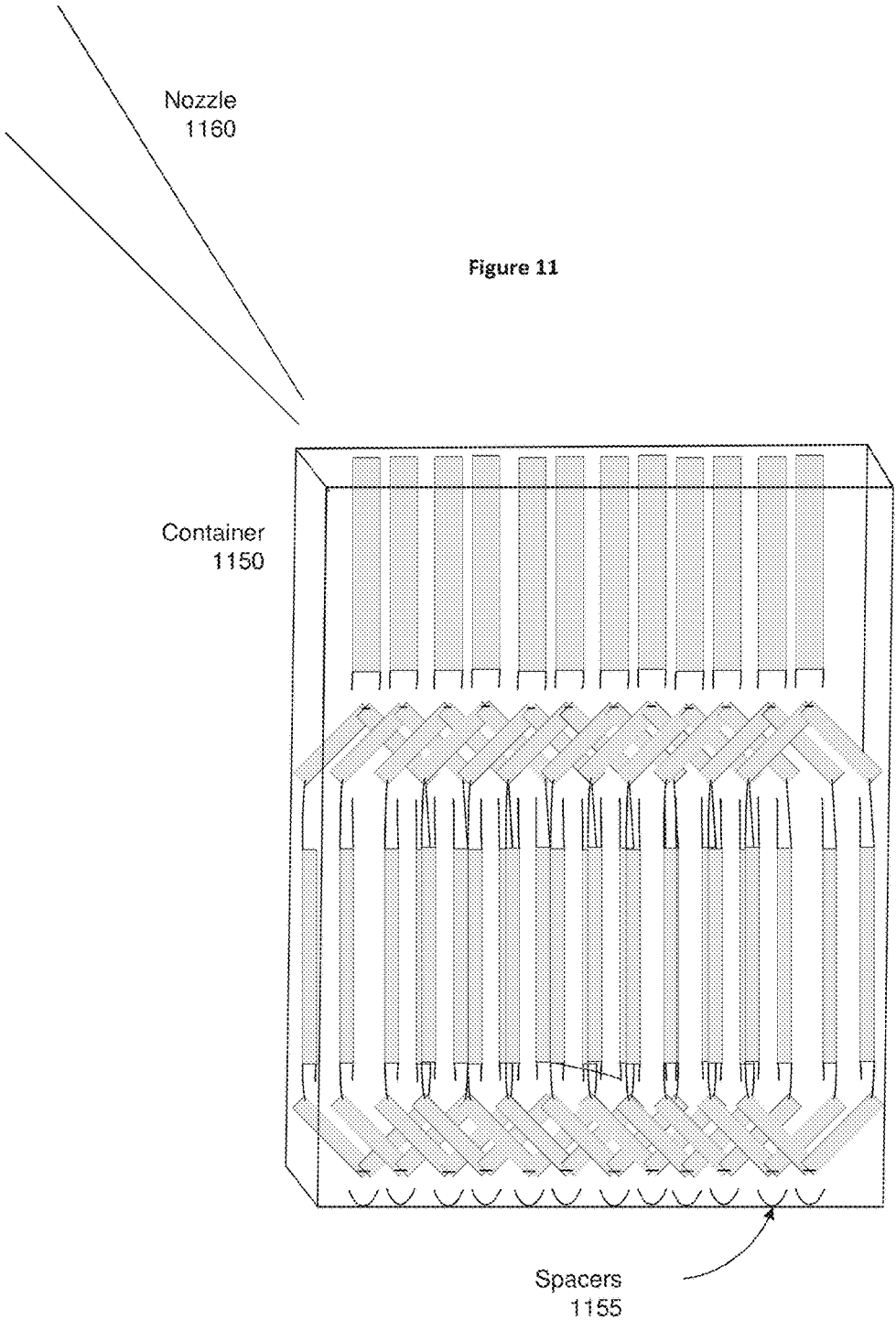
FIG. 11 shows another system for building a block for a continuous winding for electric motors, according to an aspect of the present disclosure.

FIG. 11 shows another system for building a block for a continuous winding for electric motors, according to an aspect of the present disclosure. In FIG. 11, container 1150 has spacers 1155 disposed at the bottom. Coils 1110 are placed into container 1155 before nozzle 1160 fills the container 1150 with molding. Compared to the embodiment of FIG. 10, the embodiment of FIG. 11 results in a substantially greater part of the coils 1110 being molded in molding material in order to form a block than coils 1010 in FIG. 10, as the molding is applied only to a designated portion of the container 1150.

To be sure, molding can be applied in a variety of ways, including transfer, compression, injection and vacuum pressure impregnation.

Figure 12:
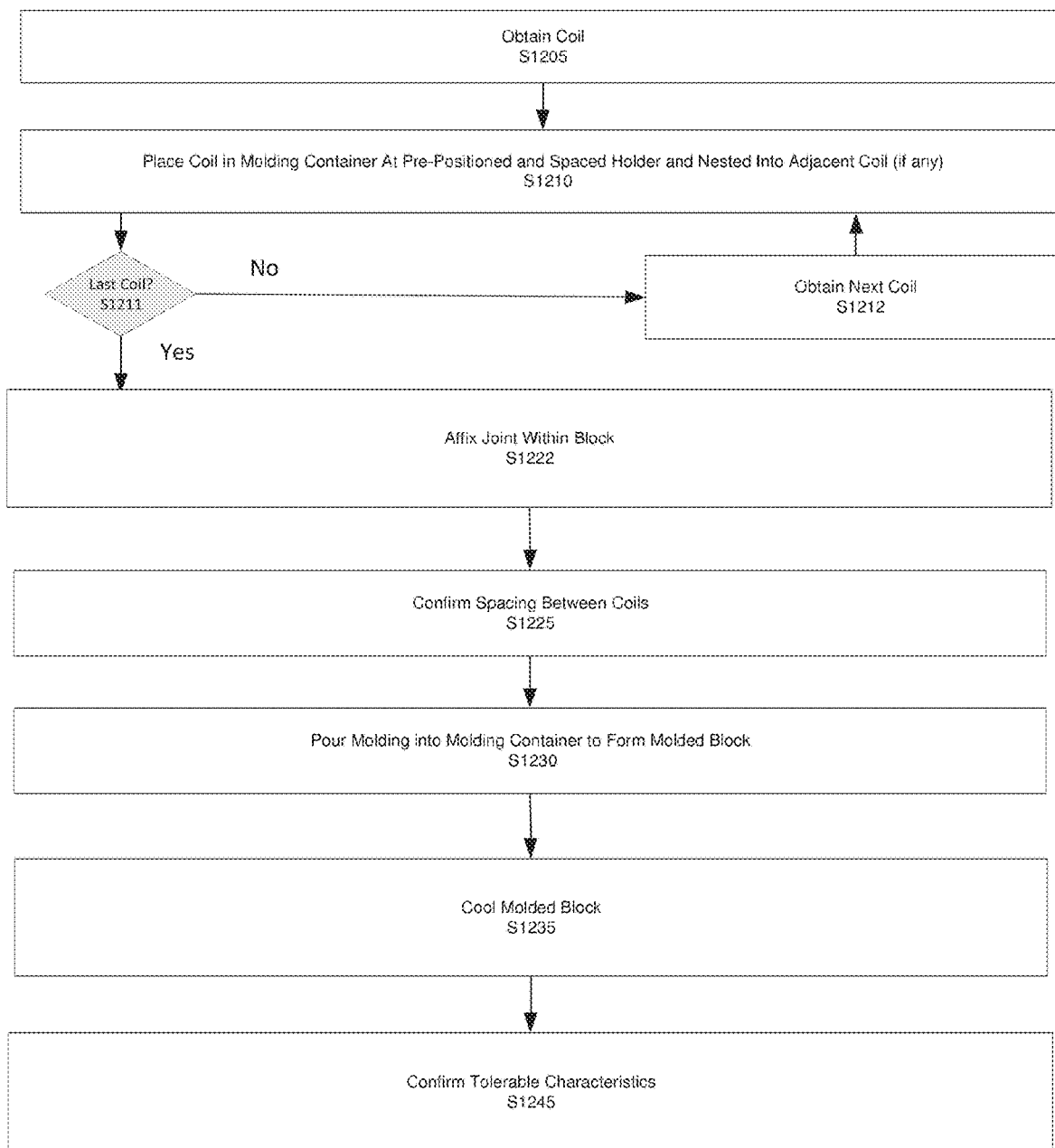
FIG. 12 shows another method for producing a continuous winding for electric motors, according to an aspect of the present disclosure.

FIG. 12 shows another method for producing a continuous winding for electric motors, according to an aspect of the present disclosure. In FIG. 12, the process begins with obtaining a first coil at S1205. At S1210, the coil is placed in a molding container such as containers 1050 in FIGS. 10 and 1150 in FIG. 11. The coil is placed in a pre-positioned and spaced holder. If another coil has already been placed into the container, the new coil is nested into the adjacent coil so as to be held in the pre-positioned holder in a position fixed relative to the adjacent coil.

At S1211 a determination is made whether the most-recently placed coil is to be the last coil. If the coil is not the last coil for the block being manufactured (S1211=No), another coil is obtained at S1212, and the next coil is placed into the molding container and positioned and spaced at S1210. If the coil is the last coil for the block being manufactured (S1211=Yes), a joint is affixed within the container for the block being manufactured at S1222.

At S1225, spacing between the coils is confirmed and at S1230 the molding is poured into the molding container in order to form a molded block. At S1235, the molded block is cooled. At S1245 characteristics of the block are confirmed, and if the characteristics are within tolerances the block is approved for installation as part of the continuous winding as described herein.

The fabrication process of FIG. 12 can use individual coils that are positioned for molding with positioning tabs or pins. Each coil can be located at a predetermined specific and absolute position relative to other coils in the block. In turn, this results in multiple resultant blocks being substantially identical. The mold is filled and processed to minimize air bubbles.

The blocks that result from the process in FIG. 12 provide structural integrity. Each coil in a block is strategically located in relation to the magnetic axis of the core that passes through the aligned coils and blocks. That is, the placing and alignment of coils and blocks provides for continuity in the magnetic core that passes through the coils and blocks.

The process of FIG. 12 through S530 can be performed off-site and then blocks can be shipped and installed in place along a track. Alternatively, the blocks can be assembled and molded on-site using a mobile construction facility. Regardless of where such blocks are built, the result is a segmented distributed winding configuration that does not leave substantial magnetic gaps between adjacent coils, adjacent blocks, and adjacent segments of multiple blocks.

The single-molding process in FIG. 12 reduces production time, labor, and costs associated with core production. Air pockets in the blocks are minimized compared to traditional manufacturing methods, which reduces the degrading effects of corona discharge on insulation due somewhat to the reduction in air pockets. This process also produces a potted winding to provide structural rigidity to the winding in a single process, as compared to conventional methodologies which generally require two processes to produce traditional laminated steel cores.

Due to the use of a flexible molding process to form the core, the architecture of the blocks resultant from the molding can be custom-designed to any number of configurations, depending on the type of motor being utilized and constraints such as sizing and placement constraints to be placed on the motor. The molding described herein can be used for systems including segmented linear motor or generator cores, segmented rotating motor or generator cores, and single-process core production with winding installation for non-segmented cores.

Figure 13:
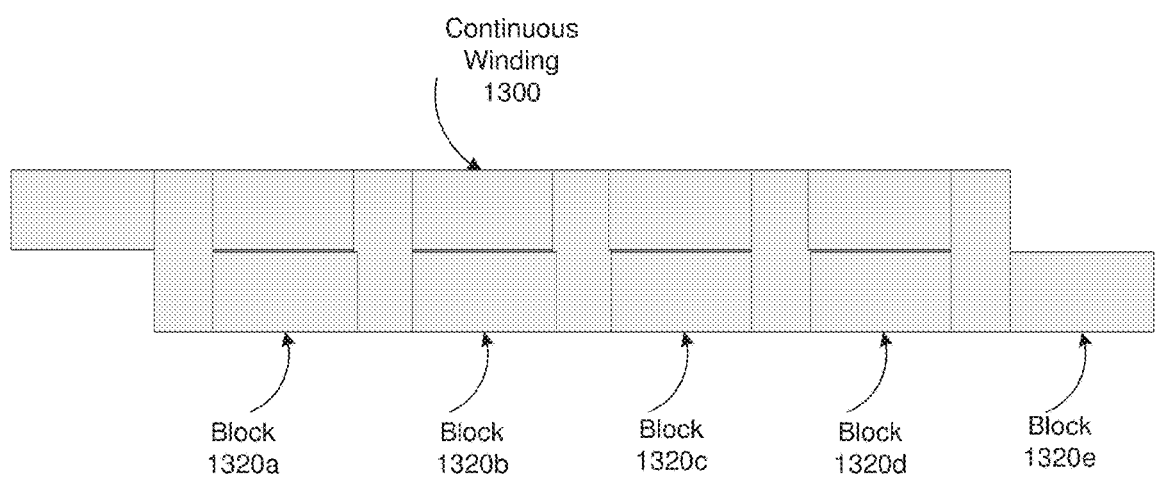
FIG. 13 shows a top view of a block for a continuous winding for electric motors, according to an aspect of the present disclosure.

FIG. 13 shows a top view of a block for a continuous winding for electric motors, according to an aspect of the present disclosure. In FIG. 13, blocks 1320*a*, 1320*b*, 1320*c*, 1320*d* and 1320*e* are shown aligned together to form a continuous winding for an electric motor. Of course, fewer than five or more than five blocks may be aligned together to form a continuous winding. Additionally, a continuous winding may include segments that each include multiple blocks and that are individually powered and dynamically controlled. Examples of a segmented continuous winding for a stator of a linear motor are disclosed in commonly assigned U.S. patent application Ser. No. 15/008,024, filed on even date herewith and entitled "Dynamic Linear Stator Segment Control", the entire contents of which are expressly incorporated by reference herein in their entirety.

Each block 1320*a*, 1320*b*, 1320*c*, 1320*d* and 1320*e* includes numerous coils such as coils 110 in FIG. 1, 210 in FIG. 2, 310 in FIG. 3, and 410 in FIG. 4. Further, the blocks 1320*a*, 1320*b*, 1320*c*, 1320*d*, 1320*e* may have the same or a substantially-similar profile as the coils, when viewed from the top or the side. For example, the blocks 1320*a*, 1320*b*, 1320*c*, 1320*d*, and 1320*e* may include coils such as the coil 910 shown in the top view of FIG. 9*b*.

Further, the blocks 1320*a*, 1320*b*, 1320*c*, 1320*d*, and 1320*e* may each be joined by sets of identical or substantially similar joints, whether the joints or built-in to the blocks during molding or whether the joints are added to the blocks afterwards. The joints may tolerate relative movement between the blocks 1320*a*, 1320*b*, 1320*c*, 1320*d*, 1320*e*, such as for thermal expansion, but the blocks are substantially fixed in place relative to positions of one another other than, for example, the movement tolerated by the joints.

Accordingly, a continuous winding for electric motors includes blocks of coils. The blocks are manufactured and positioned such that adjacent blocks continuously connect with each other. The coils within the blocks are nested, or are otherwise interlocked or interweaved in at least two orthogonal directions even before the molding is applied. The adjacent blocks produce a magnetically continuous winding, even when a distributed winding configuration is utilized.

Although a continuous winding for electric motors has been described with reference to several exemplary embodiments, it is understood that the words that have been used are words of description and illustration, rather than words of limitation. Changes may be made within the purview of the appended claims, as presently stated and as amended, without departing from the scope and spirit of a continuous winding for electric motors in its aspects. Although a continuous winding for electric motors has been described with reference to particular means, materials and embodiments, a continuous winding for electric motors is not intended to be limited to the particulars disclosed; rather a continuous winding for electric motors extends to all functionally equivalent structures, methods, and uses such as are within the scope of the appended claims.

Although the present specification describes components and functions that may be implemented in particular embodiments, the disclosure is not limited to such components, functions and embodiments.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a magnetically continuous winding includes a first coil and at least one additional coil substantially fixed in place in at least one direction with respect to a position of the first coil. The magnetically continuous winding also includes a core formed by a resin applied to the first coil and each additional coil to substantially bind the first coil and the at least one additional coil.

According to another aspect of the present disclosure, the first coil and the at least one additional coil are formed in a distributed winding.

According to yet another aspect of the present disclosure, the first coil and the at least one additional coil are insulated.

According to still another aspect of the present disclosure, the plurality of coils bound in resin form a block of a predetermined size and shape.

According to another aspect of the present disclosure, the block has a shape that allows the block and at least one other block to be substantially interlocked so as to form a continuous winding.

According to yet another aspect of the present disclosure, the block and the other block are spaced from each other so as to provide tolerance for thermal expansion.

According to yet another aspect of the present disclosure, the block and the other block are joined using substantially identical joints.

According to another aspect of the present disclosure, the block and the other block are fastened to the same guide.

According to yet another aspect of the present disclosure, the block and the other block are installed along a track before being fastened to the guide.

According to yet another aspect of the present disclosure, the resin is applied by placing the coils in a mold and by transfer, injection, compression, or vacuum pressure impregnation.

According to another aspect of the present disclosure, the resin comprises a polymer-based liquid that is applied to the first coil and the at least one additional coil and solidified.

According to yet another aspect of the present disclosure, a spacer maintains a physical separation between a first coil and one of the at least one additional coils.

According to yet another aspect of the present disclosure, voltage is applied to the block.

According to another aspect of the present disclosure, voltages up to 8410 volts are applied to the block.

According to yet another aspect of the present disclosure, the mold serves as insulation for the first coil and the at least one additional coil.

According to yet another aspect of the present disclosure, the resin has a thermoclass F characteristic.

According to another aspect of the present disclosure, the magnetically continuous winding is used as a fixed component in a substantially vacuumed transportation tube in cooperation with a rotor fixed to a pod that travels through the substantially vacuumed transportation tube.

According to yet another aspect of the present disclosure, the magnetically continuous winding is a component in a linear motor.

According to an aspect of the present disclosure, a method of producing a magnetically continuous winding includes fixedly aligning a second coil in place with a first coil in at least one direction and applying a resin to the first coil and the second coil to substantially bind the first coil and the second coil.

According to another aspect of the present disclosure, a spacer is used to substantially fix the coils in relation to each other and the edges of the block According to yet another aspect of the present disclosure, the first coil and second coil and spacers are co-molded within the resin.

According to yet another aspect of the present disclosure, the first coil and second coil are placed in a mold and the resin is applied using and using transfer, injection, compression, or vacuum pressure impregnation.

As set forth herein, a distributed winding configuration includes neighboring coils (or phases) that overlap, interlock, interweave, or otherwise connect with each other. The process of building a block with multiple coils can be automated such that the coils are placed and spaced on a platform by a machine prior to the resin being applied in order to complete a block. The process results in a core that is substantially magnetically continuous, even though multiple coils are used in each block and even though multiple blocks are individually provided and aligned. In turn, this provides a usable continuous winding component for a transportation system that may include thousands of such blocks aligned and interlocked continuously in order to form the usable continuous winding for a large linear motor that stretches for as much as tens of kilometers. As a result, such a large linear motor can be used efficiently in a high-speed transit system to propel vehicles/pods through the transit system at high speeds.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A continuous winding, comprising:
   a plurality of blocks coupled together in series, wherein each block comprises:
   a first loop, which when viewed from above, comprises a first loop portion, a second loop portion, and a first axial extension connecting a top of the first loop portion to a top of the second loop portion so that the first loop portion is parallel to and axially spaced from the second loop portion by the axial extension;
   at least one additional loop, which when viewed from above each at least one additional loop comprises a first additional loop portion, a second additional loop portion, and an additional axial extension, which has a same axial length as the first axial extension, connecting a top of the first additional loop portion to a top of the second additional loop portion so that the first additional loop portion is parallel to and axially spaced from the second additional loop portion by the additional axial extension,
   wherein the first loop and the at least one additional loop are nested together to substantially fix the first loop and the at least one additional loop in place with respect to each other in at least one direction, whereby, in the nested first loop and at least one additional loop, the first loop portion and the first additional loop portion are aligned in a first plane, the second loop portion and the second additional loop portion are aligned in a second plane, and the first plane is parallel to and axially spaced from the second plane by a distance corresponding to the length of the first axial extension; and
   a resin core applied to the nested first loop and the at least one additional loop substantially binds the first loop and the at least one additional loop together.

2. The continuous winding of claim 1, wherein the first loop and the at least one additional loop are formed in a distributed winding.

3. The continuous winding of claim 1, wherein the first loop and the at least one additional loop are insulated.

4. The continuous winding of claim 1, wherein the plurality of blocks comprise a first block and at least one other block that are configured so that the first block and the at least one other block are substantially interlockable.

5. The continuous winding of claim 4, wherein the block and the at least one other block, when coupled together, are spaced from each other so as to provide tolerance for thermal expansion.

6. The continuous winding of claim 4, wherein the block and the at least one other block are coupled together using substantially identical joints.

7. The continuous winding of claim 4, wherein the block and the at least one other block are fastened to at least one fixed structure.

8. The continuous winding of claim 7, wherein the block and the at least one other block are positionable along a track support.

9. The continuous winding of claim 1, wherein the resin core is formed by placing the first loop and the at least one additional loop nested together in a mold and subsequently transferring, injecting, compressing or vacuum pressure impregnating the nested first loop and at least one additional loop in the mold with the resin.

10. The continuous winding of claim 1, wherein a resin of the resin core comprises a polymer-based liquid that solidifies after being applied to the first loop and the at least one additional loop.

11. The continuous winding of claim 1, further comprising:
   a spacer to maintain a physical separation between the first loop and the at least one additional loop.

12. The continuous winding of claim 1, wherein a force is generated when voltage is applied to the blocks.

13. The continuous winding of claim 12, wherein voltages up to 8410 volts are applied to the blocks.

14. The continuous winding of claim 1, wherein the resin core serves as insulation for the first loop and the at least one additional loop.

15. The continuous winding of claim 1, wherein the resin has a thermoclass F characteristic.

16. A transportation system comprising:
a transportation tube; and
the continuous winding of claim 1 being arranged as a fixed component to cooperate with a rotor fixed to a pod that travels through the transportation tube.

17. The transportation system of claim 16, wherein the transportation tube is a substantially vacuumed transportation tube.

18. The continuous winding of claim 1, wherein the plurality of series coupled blocks is a component in a linear motor.

19. A method of producing a continuous winding, comprising:
coupling a plurality of blocks together in series,
wherein each of the blocks, which include at least a first loop, which when viewed from above, comprises a first loop portion, a second loop portion and a first axial extension connecting a top of the first loop portion to a top of the second loop portion so that the first loop portion and the second loop portion are parallel to each other and spaced by the first axial extension having a first axial length, and a second loop, which when viewed from above, comprises third loop portion, a fourth loop portion and a second axial extension, having a same axial length as the first axial extension, connecting a top of the third loop portion to a top of the fourth loop portion so that the third loop portion and the fourth loop portion are parallel to each other and spaced by the second axial extension, are formed by:
nesting together the first loop and the second loop to fix the first and second loops in place in at least one direction, whereby, in the nested first loop and second loop, the first loop portion and the third loop portion are aligned in a first plane and the second loop portion and the fourth loop portion are aligned in a second plane, and the first plane and second plane are parallel each other and spaced by a distance corresponding to the length of the first axial extension; and
applying a resin to the nested first loop and second loop to substantially bind the first loop and the second loop together.

20. The method of claim 19, wherein spacers are arranged to maintain a spacing between the first loop and the second loop and to provide a spacing between adjacent blocks of the series coupled plurality of blocks.

21. The method of claim 20, wherein the first loop and second loop and spacers are co-molded within the resin.

22. The method of claim 19, wherein the forming of the blocks comprises:
nesting the first loop and second loop in a mold; and
applying the resin by one of: transferring, injecting, compressing or vacuum pressure to impregnate the nested first and second loops in the mold.

23. The method of claim 19, further comprising nesting the plurality of blocks together.

* * * * *